A. H. DALLY.
ANTISKIDDING DEVICE FOR AUTOMOBILES.
APPLICATION FILED APR. 4, 1916.
1,208,920.
Patented Dec. 19, 1916.
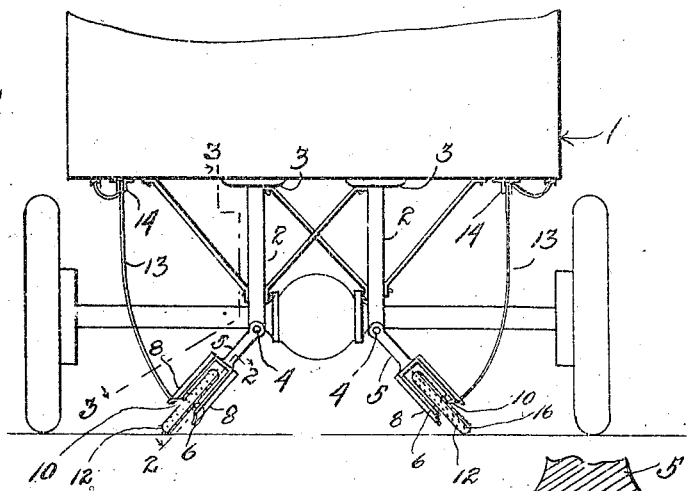
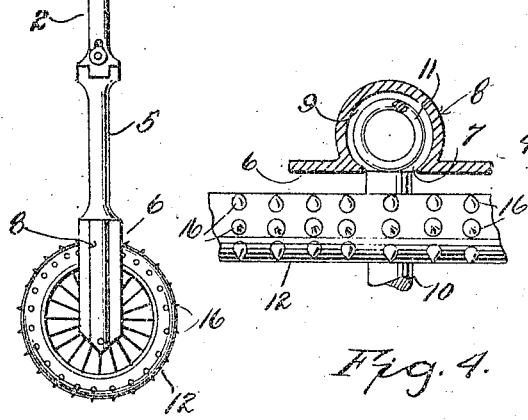
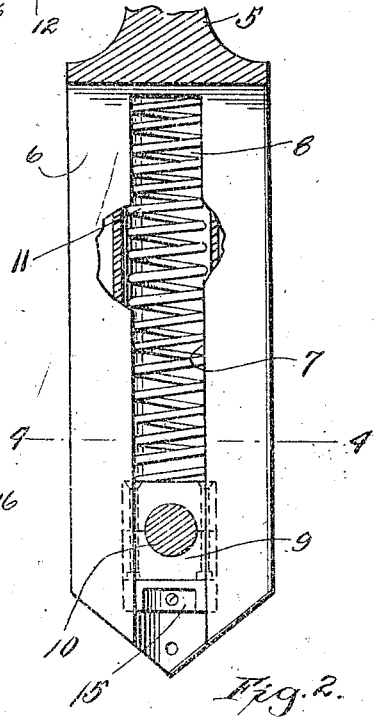

UNITED STATES PATENT OFFICE.

ALGERNON HARRY DALLY, OF SEATTLE, WASHINGTON.

ANTISKIDDING DEVICE FOR AUTOMOBILES.

1,208,920.  Specification of Letters Patent.  Patented Dec. 19, 1916.

Application filed April 4, 1916. Serial No. 88,845.

*To all whom it may concern:*

Be it known that I, ALGERNON H. DALLY, a citizen of the United States, residing at Seattle, in the county of King, State of Washington, have invented certain new and useful Improvements in Antiskidding Devices for Automobiles; and I do hereby declare the following to be a full, clear, and exact description of the invention, such as will enable others skilled in the art to which it appertains to make and use the same.

The present invention is directed to improvements in devices for preventing skidding of automobiles or other vehicles, and has for its object to so construct a device of this character that it can be conveniently attached to the body of a vehicle, and is capable of being raised or lowered for engaging or disengaging the surface.

A further object of the invention is to provide a device of this character comprising a pair of yieldably supported wheels adapted to be lowered into engagement with the surface should the wheels of the car tend to skid.

With these and other objects in view, this invention resides in the novel features of construction, formation, combination and arrangement of parts to be hereinafter more fully described, claimed and illustrated in the accompanying drawing, in which:—

Figure 1 is a fragmentary rear elevation of an automobile equipped with the device. Fig. 2 is a sectional view on line 2—2 of Fig. 1. Fig. 3 is a sectional view on line 3—3 of Fig. 1. Fig. 4 is a sectional view on line 4—4 of Fig. 2.

Referring to the drawing 1 indicates the body of the vehicle, 2 a pair of spaced rods, which have their upper ends provided with annular flanges 3, which are secured in any suitable manner to the floor of the vehicle body and adjacent the rear edge thereof, so that said rods will be located a slight distance rearwardly of the rear axle of the vehicle. The lower ends of the rods 2 are provided with stub shafts 4, which are pivotally engaged by the upper ends of the arms 5, said arms having their lower ends provided with furcations 6, said furcations being provided with longitudinal slots 7, which open into the tubular chamber 8.

Slidable in the chamber 8 are bearings 9 for engaging the axles 10 which extend into the slots 7 for vertical movement.

Coil springs 11 are mounted in the slots 7 and have their upper ends engaged with the upper walls of the chamber 8 and their lower ends resting on the bearings 9 so as to yieldably support the axles 10.

Rotatably mounted on the axles 10 are ground engaging wheels 12, and since the arms 5 are normally held in their raised position, said wheels will be disengaged from the surface. To hold the arms 5 in their raised or inoperative position, cords 13 are provided and have their rear ends fixed to the upper furcations 6, said cords being passed over the pulleys 14 supported by the vehicle and are extended forwardly to the driver's seat, whereby the cords can be grasped to raise or lower the arms 5. Assuming that the arms are in their raised position, and the vehicle would tend to skid, it is only necessary to release the desired cord so as to lower one of the arms, which being lowered the wheel thereof will engage the surface, thus preventing further skidding of the vehicle.

By yieldably supporting the axles 10, the wheels will be permitted to move upwardly between the furcations 6, so as to prevent the arms from alining with the rods 2, but at the same time holding said wheel in engagement with the surface. It is obvious that should the arms 5 aline with the rods 2 that the vehicle would be tilted, and it is to overcome this objection that the bearings 9 are yieldably supported. The bearings 9 are held in the chambers 8 by the plates 15 which are formed to conform to the interior formation of the chambers.

The wheels 12 are provided with spurs 16 which seem to prevent skidding of the wheels when in their operative position.

What is claimed is:—

In combination with a vehicle, of rods depending from the bottom thereof, arms pivotally connected with the rods, said arms having their lower ends provided with furcations, said furcations having longitudinal slots formed therein, chambers carried by the furcations and opening into said slots, axles having their ends extended into the slots, wheels carried by the axle, bearings slidable in the slots of the chambers, coil springs engaged in the chambers and having their upper ends engaged with the upper end of the chamber, and means for raising or lowering the arms.

In testimony whereof, I affix my signature, in the presence of two witnesses.

ALGERNON HARRY DALLY.

Witnesses:
A. I. CARPENTER,
L. LENARD.